(12) United States Patent
Green et al.

(10) Patent No.: US 8,504,066 B1
(45) Date of Patent: Aug. 6, 2013

(54) REDUCING POWER CONSUMPTION OF MOBILE DEVICE THROUGH AUTOMATED ENVIRONMENT AWARENESS

(75) Inventors: Travis Harrison Kroll Green, New York, NY (US); Aaron Baeten Brown, Croton on Hudson, NY (US); Sheridan Kates, New York, NY (US); Amir Menachem Mané, Lincroft, NJ (US); Arnaud Sahuguet, New York, NY (US); Jeremy Brand Sussman, Bedford Hills, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/466,586

(22) Filed: May 8, 2012

(51) Int. Cl.
*H04M 1/68* (2006.01)
*H04W 4/00* (2009.01)

(52) U.S. Cl.
USPC ............. 455/456.1; 455/411; 455/435.1

(58) Field of Classification Search
USPC ............. 370/328, 331; 455/410, 411, 456.3, 455/436
See application file for complete search history.

(56) References Cited

U.S. PATENT DOCUMENTS

| | | | |
|---|---|---|---|
| 7,606,602 B2 | 10/2009 | Zhang et al. | |
| 7,983,719 B2 | 7/2011 | Abdel-Kader | |
| 2007/0263611 A1* | 11/2007 | Mitchell | 370/356 |
| 2008/0095097 A1* | 4/2008 | Mehta et al. | 370/328 |
| 2009/0195349 A1 | 8/2009 | Frader-Thompson et al. | |
| 2009/0281886 A1 | 11/2009 | Castelli et al. | |
| 2010/0150102 A1* | 6/2010 | Li et al. | 370/331 |
| 2010/0317408 A1 | 12/2010 | Ferren et al. | |
| 2011/0117903 A1 | 5/2011 | Bradley | |
| 2011/0211511 A1 | 9/2011 | Bakthavathsalu et al. | |
| 2011/0263276 A1* | 10/2011 | Heyman et al. | 455/456.3 |
| 2012/0149337 A1* | 6/2012 | Singh et al. | 455/411 |

\* cited by examiner

*Primary Examiner* — Nizar Sivji
(74) *Attorney, Agent, or Firm* — Remarck Law Group PLC

(57) ABSTRACT

A computer-implemented method is provided for reducing power consumption of a power source used by a mobile device. The mobile device monitors aspects of its environment to determine if some or all of the device's computing functionality can be handled seamlessly by another nearby device. For example, phone calls can be directed to a landline phone nearby the mobile device. A device usage policy defines how certain functions are to be handled by the mobile device, for example, at a given location or amongst two devices. The mobile device can then disable functionality that is being handled by nearby devices, thereby reducing power consumption by the mobile device.

20 Claims, 7 Drawing Sheets

| LOCATION | DIRECT CALLS | SYNC CALENDAR | SYNC WORK EMAIL ACCOUNT | SYNC PERSONAL EMAIL ACCOUNT |
|---|---|---|---|---|
| Office | Office | Yes | No | No |
| Home | Home | Yes | Yes | Yes |
| Car | Mobile | Yes | Yes | No |
| Default | Mobile | Yes | Yes | No |

51 → Default

FIG. 5

REDUCING POWER CONSUMPTION OF MOBILE DEVICE THROUGH AUTOMATED ENVIRONMENT AWARENESS

BACKGROUND

As individuals become increasingly reliant on mobile phones and other mobile computing devices for communication and access to information, the limited battery life of such devices can negatively impact the user experience. Because, individuals often spend large parts of their day in locations (e.g., home office, workplace, etc.) where the functions of the mobile devices are duplicated by other, non-mobile devices, (e.g., desktop computers, land-line telephones, etc.) much mobile device battery consumption—resultant from execution of such duplicative functionality—is unnecessary.

Therefore, it is desirable to reduce power consumption of mobile devices through automated environment awareness, based, for example, on a mobile device's location and/or proximity to other computing devices. This section provides background information related to the present disclosure which is not necessarily prior art.

SUMMARY

A computer-implemented technique is provided for reducing power consumption of a power source used by a mobile device. The mobile device can monitor aspects of its environment to determine if some or all of the device's computing functionality can be handled seamlessly by another nearby device. For example, phone calls can be directed to a landline phone nearby the mobile device. A device usage policy can define how certain functions are to be handled by the mobile device, for example, at a given location or amongst two devices. The mobile device can then disable functionality that is being handled by nearby devices, thereby reducing power consumption by the mobile device.

In one example technique, measures to reduce power consumption can be taken by the mobile device based on the location of the mobile device without necessarily any communication with any other computing devices. To do so, the mobile device can monitor its location and identifies functions enabled by the mobile device while the mobile device is at a given location. The mobile device can then disable one of the identified functions enabled by the mobile device while the mobile device is at the given location in accordance with a device usage policy.

In another example technique, measures to reduce power consumption can be taken by the mobile device based on a message exchange with another device proximate to the mobile device. Upon receiving a message from another computing device proximate to the mobile device, the mobile device can identify functions enabled on the mobile device but performed by the other computing device. The mobile device can then disable one of the identified functions enabled on the mobile device in accordance with a device usage policy.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIG. 5 depicts an example device usage policy;

Figure 6:
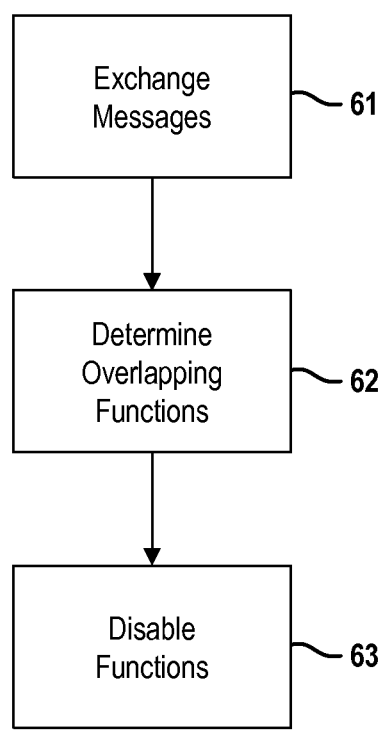
Figure 7:
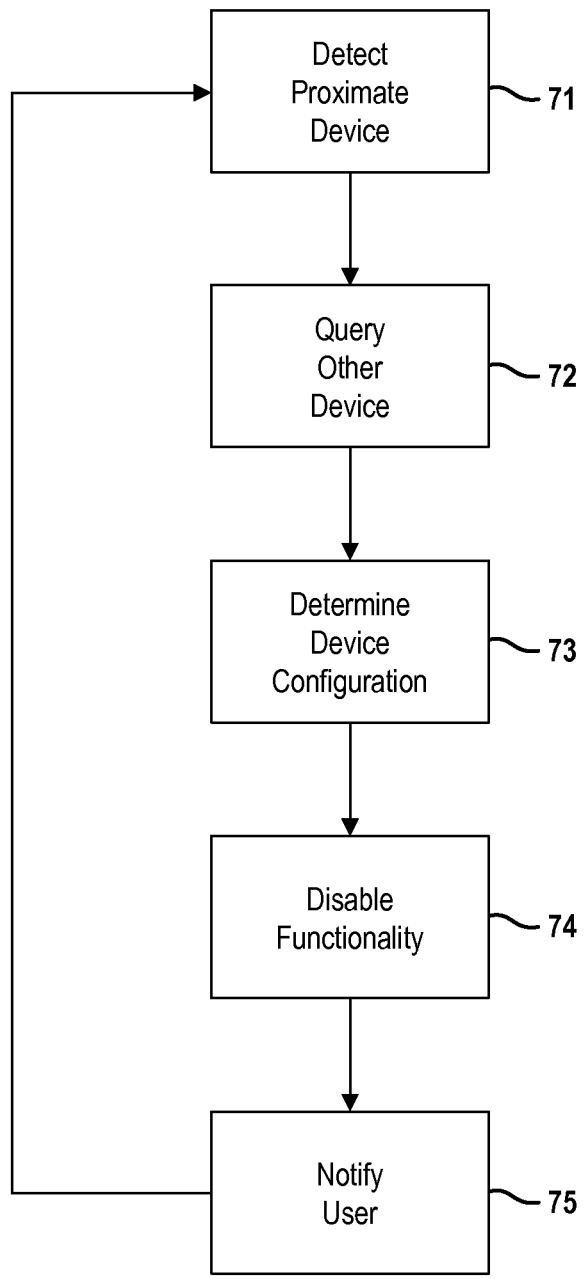

FIG. 6 is a diagram provide an overview of a second example technique for reducing power consumption in a mobile computing device; and FIG. 7 is a flowchart of the processing steps for the second example technique as implemented by the power management module The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
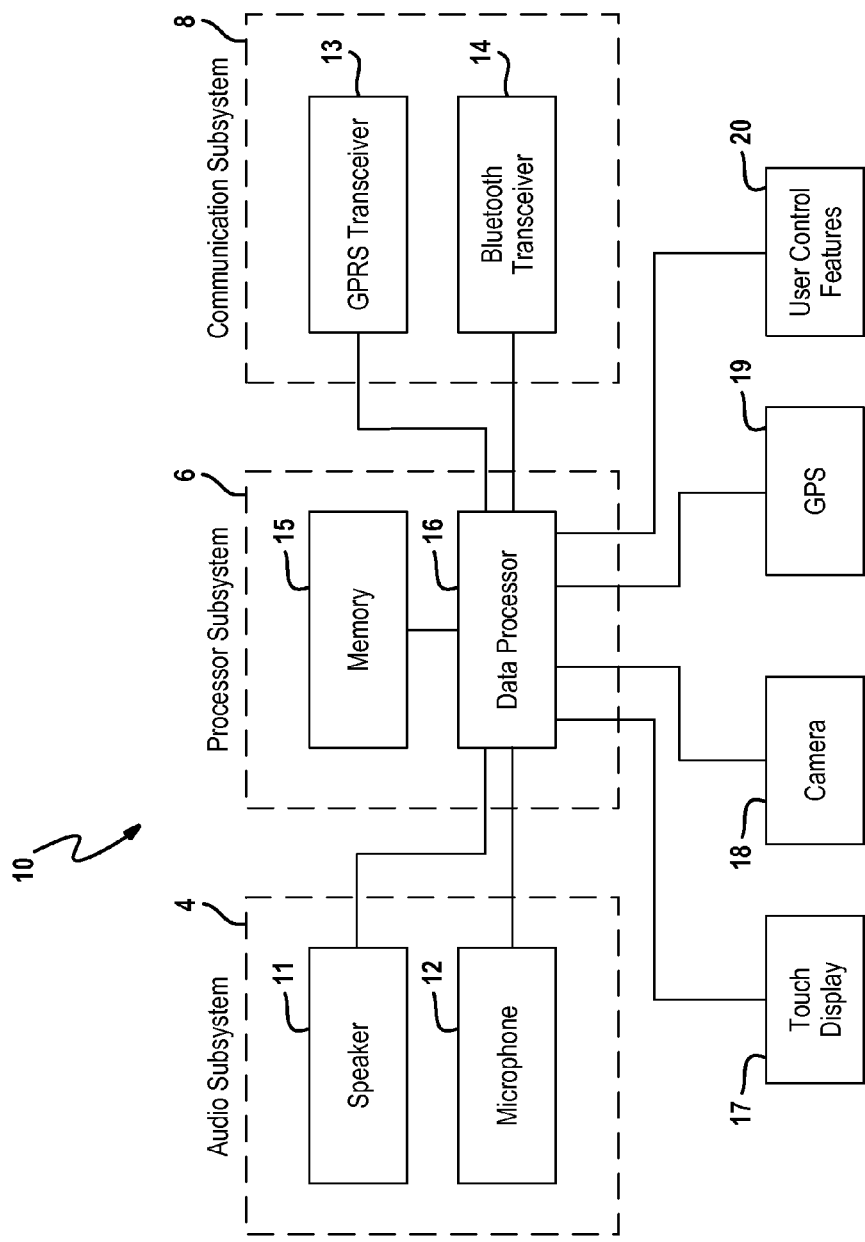
FIG. 1 is a block diagram depicting an example architecture for a mobile computing device.

FIG. 1 depicts an example architecture for a mobile computing device 10, such a mobile smartphone. The mobile computing device 10 can be comprised generally of: an audio subsystem 4, a processor subsystem 6 and a wireless communication subsystem 8. Components comprising each of these subsystems are further described below. It is to be understood that only the relevant components are discussed below, but that other known components (e.g., power source) may be needed to control and manage the overall operation of the mobile computing device. Within the broader aspects of the disclosure, it is also envisioned that these components may be arranged in other varying configurations.

The audio subsystem 4 can be comprised of a microphone 12 for capturing audio input from the device operator and a speaker 11 for outputting audio data to the device operator. Such audio components are readily known in the art.

The wireless communication subsystem 8 can include one or more wireless transceivers. Cellular transceiver 13 is one example type of wireless transceiver. Bluetooth transceiver 14 is another example type of wireless interface. Other types of wireless interfaces may include but are not limited to satellite, Wi-Fi, near field communication, and others.

During operation, speech input captured by the microphone 12 can be converted to suitable form by the processor subsystem 6 before being passed along to the communication subsystem 8 for transmission. Likewise, incoming signals received by the communication subsystem 8 can be passed along for processing to the processor subsystem 6 and may be output by the speaker 11. Overall operation and control of the mobile device can also carried out by the processor subsystem 6. The processor subsystem 6 can include one or more data processors 16, one or more memory devices 15 and other electronic circuitry.

The processor subsystem 6 may also be interfaced with various peripheral components. Example peripheral components can include but are not limited to a touch sensitive display 17, a camera 18, a GPS device 19 as well as user controls 20, such as on/off buttons or volume controls. While the following description is provided with reference to a mobile phone, it is readily understood that the concepts disclosed herein are applicable to other types of mobile computing devices, such as cameras, handheld navigation devices, tablet computers, laptop computer, etc.

Figure 2:
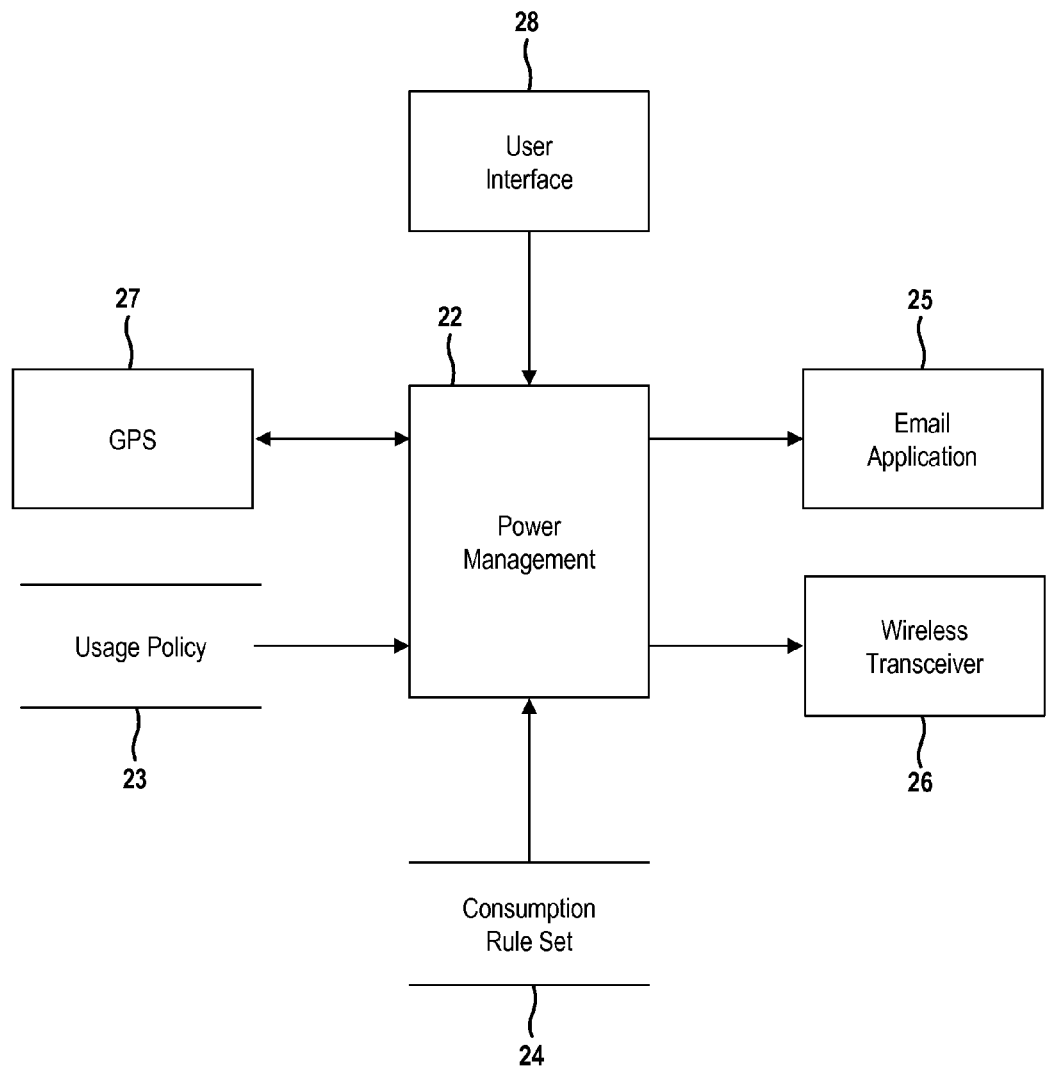
FIG. 2 is a block diagram depicting a power management module in the context of the mobile computing device.

Techniques for reducing power consumption in the mobile computing device can be implemented by a power management module 22 as depicted in FIG. 2. In one example embodiment, the power management module 22 can be a computer program implemented by processor subsystem 6 of the mobile computing device 10. Different techniques for reducing power consumption that are implemented by the power management module 22 are described in more detail below.

Generally, the power management module 22 can monitor aspects of its environment to determine if some or all of the device's computing functionality can be handled seamlessly by another nearby device. For example, email messages can be read and responded to using a desktop computer currently being utilized by an intended recipient and/or phone calls can be directed to a nearby landline phone nearby the mobile computing device 10. To determine what functionality can or cannot be handled by other devices, the power management module 22 can make reference to a device usage policy 23 and a power consumption rule set 24 as further described below. The power management module 22 can then disable functionality that is being handled by these nearby devices in accordance with the device usage policy 23. To reduce power consumption, the power management module 22 is shown, for example, interacting with an email application 25 as well as a wireless transceiver 26 residing on the mobile computing device 10. The power management module 22 may also interact with other device components, such as a GPS component 27 and user interface components 28.

Figure 3:
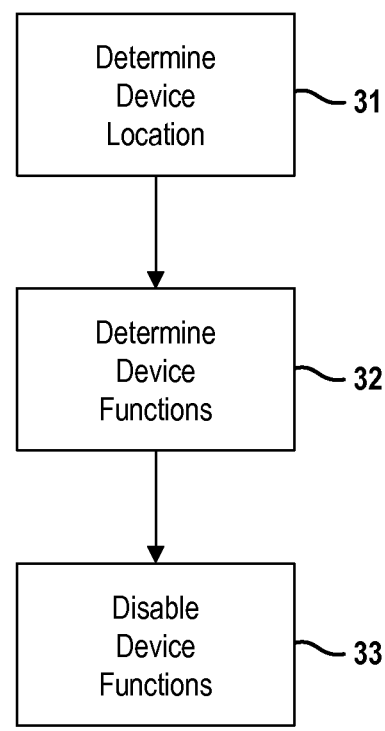
FIG. 3 is a diagram providing an overview of an example technique for reducing power consumption in a mobile computing device.

FIG. 3 provides an overview of one example technique for reducing power consumption in a mobile computing device 10. In this example, power consumption measures can be taken based on the location of the mobile computing device 10 without necessarily any communication with other computing devices. Thus, the mobile device 10 can monitor its location at 31 and thereby determine its presence at a given location using a positioning service (e.g., GPS) accessible to the mobile device. In some embodiments, the positioning service may determine location from GPS, WiFi triangulation methods, location signals from cell towers or the like. In other embodiments, the positioning service may determine location by recognizing a Bluetooth transceiver, for example, in a vehicle or another location. The positioning service may also employ combinations of the techniques noted above. In all embodiments, such location monitoring occurs only when the user enables this functionality. It is also envisioned other techniques for determining location fall within the scope of this disclosure.

With reference to a device usage policy, the mobile device can identify functions to be performed while the mobile device is at the given location as indicated at 32. In this example technique, the device usage policy can define how certain functions are to be handled at a given location (e.g., whether to disable the function at the location). In some embodiments, the device usage policy 23 can be stored locally by the mobile device as shown in FIG. 2. In other embodiments, the device usage policy 23 may be stored remote from the device, for example, at a cloud computing service accessible to the mobile device 10. Particular actions related to the identified functions can then be taken at 33 to reduce power consumption by the mobile device. Example actions may include but are not limited to configuring parameters related to the identified functions and disabling or powering down components related to the identified functions.

Figure 4:
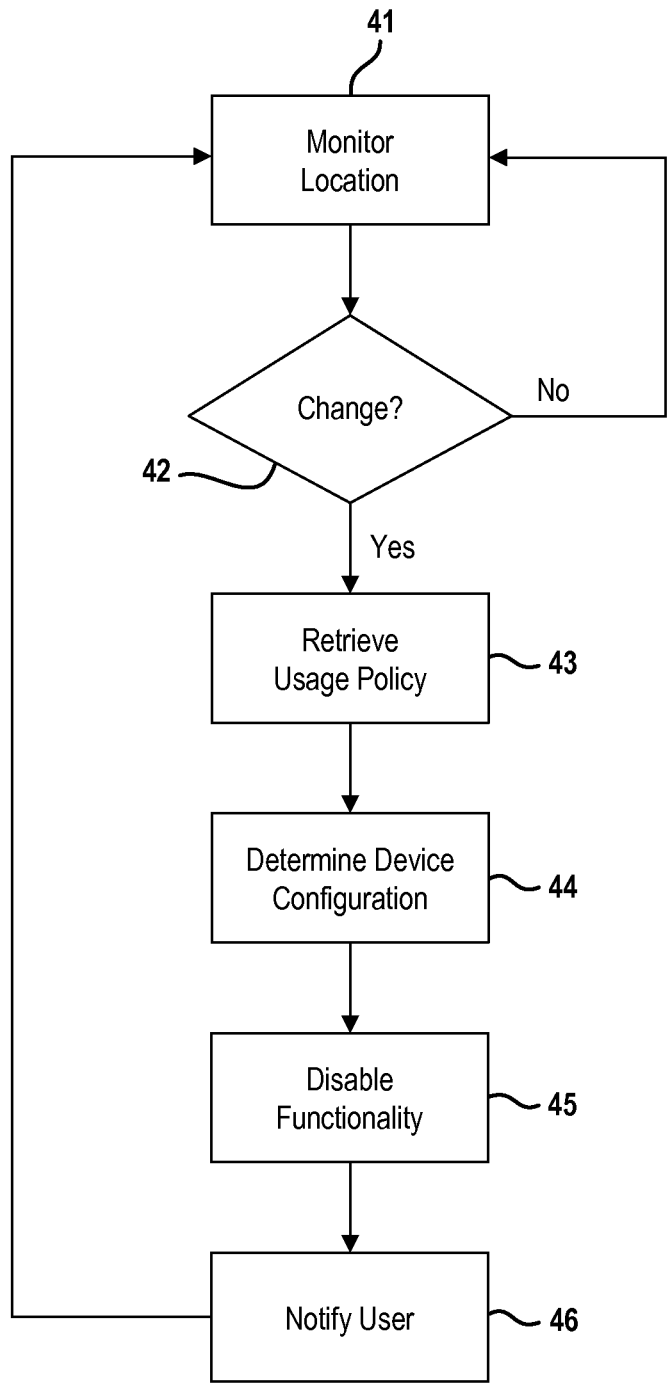
FIG. 4 is a flowchart of the processing steps for the example technique as implemented by the power management module.

Process steps for implementing this technique by the power management module 22 are further described in relation to FIG. 4. Location of the mobile device can be monitored periodically at 41 by the power management module 22 (when authorized by the user). In one embodiment, the power management module 22 can interface with an onboard GPS module 27 to determine its current location. The newly determined location can be compared at 42 to a previously stored location for the computing device. When the location remains unchanged, the power management module 22 can continue to monitor device location. Other techniques for determining a current location may also be used by the power management module 22.

When the device location changes, the power management module 22 can proceed to retrieve at 43 a device usage policy 23 defined for the mobile computing device 12. The usage policy 23 can define how certain functions are to be handled at different device locations. For illustration purposes, the usage policy 23 may specify how to handle incoming telephone calls, whether to synchronize calendar events or whether to synchronize email messages from different accounts as shown in FIG. 5. In this example, incoming phone calls can be directed to a mobile phone number when the user is traveling in their vehicle but directed to a home phone number when the user is at home. Additionally, email messages from a work account are not synchronized on the mobile device while the mobile device is at the office but can otherwise be synchronized on the mobile device. Other types of example functions defined by the device usage policy may include but are not limited to whether to send gaming related notifications, social networking notifications and calendar updates.

In some instances, the current device location may not match any of the locations specified by the usage policy. To accommodate this situation, a default policy 51 may be defined for the mobile device 12. For example, a default policy may specify that incoming calls and messages are to be directed to the mobile computing device. This default policy can be applied by the power management module 22 when the current device location fails to match any of the locations specified by the usage policy.

The usage policy may also be extended to include a time component. For example, the usage policy may specify not to sync email messages on the mobile device while the mobile device is at the user's workplace on weekdays between 9 am and 6 pm. The power management module 22 can apply this usage policy only during the specified time period. The policy may be supplemented by a first default policy that specifies to sync email messages on the mobile device on weekdays as well as a second default policy that specifies not to sync email messages on the mobile device on weekends. Thus, more than one default policy may be defined to accommodate different time periods. Usage polices having varying time periods are contemplated by this disclosure.

In some embodiments, the power management module 22 can be configured to provide an interface that enables the device user to define their usage policy. In other embodiments, the power management module 22 may rely upon machine learning algorithms readily known in the art to determine a user's preferences and develop usage policies accordingly. In either case, the usage policies can be tailored to meet a user's personal preferences.

Given a retrieved usage policy, the power management module 22 can determine at 44 an appropriate configuration for the mobile computing device. More specifically, the power management module 22 can determine what particular actions can be taken to reduce power consumption by the mobile device in accordance with a power consumption rule set. For each function specified by the usage policy 23, the power management module 22 can look for corresponding rule(s) in the power consumption rule set 24. Continuing with the examples set forth above, the usage policy 23 may specify how to handle incoming calls. A corresponding rule for this function is to disable (or power down) any cellular transceivers when incoming calls are directed to devices other than the mobile computing device 10, such as an office or home phone. Since incoming calls will be received by a different phone while at the given location, power consumption can be reduced by powering down the cellular transceiver on the mobile device 10. In another example, when the usage policy 23 specifies not to sync email messages on the mobile device while the mobile device is at the user's workplace, the corresponding rule for this function is to disable the sync functionality in the email application 25 residing on the mobile device 10. In this way, device usage policies 23 can be translated to particular actions for reducing power consumption. The power management module 22 in turn can implement the particular actions at 45 in accordance with the power consumption rule set.

The device user may be notified at 46 by the power management module 22 as to which functions have been disabled. In one example, the user can be notified by a message displayed on a display of the device, such as "email sync disabled—click here to enable this function". Notification may be provided immediately upon disabling a function or may be deferred until the next time the user interacts with the mobile device. Other types of messages and techniques for notifying the device user fall within the scope of this disclosure.

Once the device has been configured, the power management module 22 can continue to monitor location of the device as indicated at 41. Upon detecting a change in device location, the process can be repeated. In this way, power conservation is achieved in a seamless manner without user involvement. It is to be understood that only the relevant steps of the methodology are discussed in relation to FIG. 4, but that other software-implemented instructions may be needed to control and manage the overall operation of the system.

The power management module 22 may also provide mechanisms to override the device configuration and reactivate disabled functions. In one embodiment, a disabled function may be re-enabled by pressing a button presented on a display of the device. In another embodiment, a disabled function may be re-enabled when the application associated with the function is the accessed on the device by the user. For example, when a user accesses an email application on the mobile device, message syncing can occur even if this function was previously disabled. Disabled functions may also be re-enabled when the mobile device leave the current location. Other means for activating disabled functions are contemplated by this disclosure.

In another power consumption technique, a mobile device can disable functionality based on a message exchange with another device proximate to the mobile device as shown in FIG. 6. For example, a mobile phone may learn from the message exchange about services that are performed by the other device but also enabled on the mobile phone, such as email. Thus, the mobile device receives a message at 61 that provides an indication of services that are performed by the other computing device.

From the message, the mobile device can identify overlapping services as indicated at 62, that is, services enabled on the mobile device but that are also performed by the other computing device. The mobile device can then disable at 63 one or more functions to be performed by the mobile device in accordance with the energy consumption policy, where the functions pertain to the identified overlapping services. Continuing with the example set forth above, the mobile phone can disable email syncing functionality while in the presence of the other device.

Process steps for implementing this technique for implementing this technique by the power management module 22 are further described in relation to FIG. 7. The power management module 22 can detect or otherwise become aware at 71 of the presence of other devices. In one embodiment, the power management module 22 can register with the device operating system to receive notification of newly formed wireless connections (e.g., Bluetooth data link). Different techniques for detecting proximate devices may be employed by the mobile device.

Upon detecting the presence of another device, the power management module 22 can query the other device at 72 to determine what services may be shared amongst the two devices. In response to the query, the power management module 22 can receive a message indicating the services that are available and/or being performed by the other computing device. In an alternative approach, the power management module 22 may learn about the service available on the other computing device from a cloud computing service. In this approach, the power management module 22 queries the cloud computing service rather than querying the other computing device directly. Thus, implementing power management techniques can be based on proximity of two devices to each other with exchanging messages between the devices.

Given a listing of services available on the other computing device, the power management module 22 can determine at 73 an appropriate configuration for the mobile computing device. To do so, each service can be correlated to a device configuration in accordance with a predefined device usage policy. For illustration purposes, the usage policy may define a service, a device type for the other device and a correlated configuration as follows.

| Service | Device type | Configuration |
|---------|-------------|---------------|
| email   | tablet      | sync on tablet only |
| phone   | tablet      | direct call to mobile |
| email   | laptop      | sync on laptop only |
| phone   | laptop      | direct call to laptop |

As between the user's mobile phone and tablet computer, the user may prefer to read email messages using their tablet while receiving incoming calls on their mobile phone. In contrast, as between the user's mobile device and laptop computer, the user may prefer receive incoming calls and read email messages using their laptop computer. In this example, user has defined configuration preferences related to email and phone services for two different device types. It is readily understood that other types of services, device types and configurations fall within the scope of this disclosure.

The power management module 22 can then translate the configuration settings at 74 into particular actions to be taken in accordance with the power consumption rule set. Continuing with the examples set forth above, the usage policy may specify how to handle incoming calls. A corresponding rule for this function is to disable any cellular transceivers when incoming calls are directed to devices other than the mobile computing device 10. In another example, when the usage policy specifies not to sync email messages on the mobile device, the corresponding rule for this function is to disable the sync functionality in the email application residing on the mobile device 10. Lastly, the device user may be notified at 75 by the power management module 22 as to which functions have been disabled.

Once the device has been configured, the power management module 22 can continue to detect the presence of other devices as indicated at 71. Upon detecting the presence of another device, the process can be repeated. In this way, power conservation is achieved in a seamless manner without user involvement. It is to be understood that only the relevant steps of the methodology are discussed in relation to FIG. 7, but that other software-implemented instructions may be needed to control and manage the overall operation of the system.

In this embodiment, the power management module 22 can implement power consumption measures without any explicit handoff with the other device. In other words, each device can be configured to communicate its available services to the other and operates independently to implement appropriate measures.

In some embodiments, the devices can operate cooperatively to handoff responsibility for functions to be handled by each device. To do so, one device may assume a controlling role. In one example, the controlling device can be determined by a predefined hierarchy of devices based on device type. The controlling device would determine the configuration for each device in accordance with a usage policy and in the manner set forth above. The controlling device would then implement power consumption measures applicable to itself. Additionally, the controlling device would communicate those functions to be handled by the other device, which would in turn implement corresponding power consumption measures. In this way, responsibility for certain functions can be explicitly negotiated between the two devices. In some scenarios, only one of the two devices may permit or be configured to implement power consumption measures. Such devices can implement the measures to the extent possible.

In other embodiments, the usage policy can delegate functions amongst two or more devices depending upon which device has the user's attention or is currently being interacted with by the user. For these embodiments, the usage policy may be extended to specify which device has the user's attention as follows.

| Service | Device | User attention | Configuration |
|---------|--------|----------------|---------------|
| email | desktop | tablet | sync on tablet only |
| email | desktop | desktop | sync on desktop only |

Determining which of two or more proximate devices has the user's attention may be achieved in different ways. For instance, a device having received input (e.g., touch input on a touchscreen) or experienced other interactions with the user within a predetermined time period may be deemed the device having the user's attention. In another instance, the device hosting an application with an active user session may be deemed the device having the user's attention. Other techniques for determining which device has the user's attention or is currently being interacted with are also contemplated by this disclosure. Given which of two devices has the user's attention, the power management module 22 can translate the configuration settings into particular power conservation actions and implements the actions in the manner set forth above.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program or computer modules stored on a computer-readable medium that can be accessed by the computer. Such a computer program or computer modules may be stored in a tangible computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided as examples.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description and the term example is used in the sense of being representative or serving as a model. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for reducing power consumption of a power source used by a mobile device, comprising:
- receiving, at a mobile device, via a wireless communication link, a message from a computing device proximate to the mobile device, the message providing an indication of one or more functions that are performed by the computing device;
- identifying, by the mobile device, a given function enabled at the mobile device that is performed by the computing device;
- disabling, by the mobile device, in accordance with a device usage policy, the given function, wherein at least one of the identifying and the disabling is based at least in part on receiving a message from the proximate computing device;
- determining, by the mobile device, that a device type of the computing device is not specified in the device usage policy;
- retrieving, by the mobile device, a default rule from the device usage policy, the retrieving being performed in response to the determination that the device type is not specified in the device usage policy; and
- determining, by the mobile device, a particular action for reducing power consumption in accordance with the default rule.

2. The method of claim 1 wherein the device usage policy specifies a function supported by the mobile device, the device type of the computing device, and an indicia for handling the function.

3. The method of claim 2 further comprising:
- determining, by the mobile device, using the device usage policy, an indicia for handling the given function; and
- determining, by the mobile device, based on the indicia for handling the given function, a particular action for reducing power consumption.

4. The method of claim 2 further comprising:
- determining, by the mobile device, that the computing device is currently being interacted with by a user; and
- disabling, in accordance with the device usage policy, the given function, where the device usage policy further specifies a device that is being interacted with by a user.

5. The method of claim 1 further comprising outputting, by the mobile device, a notification that the given function has been disabled.

6. The method of claim 1 wherein the disabling the given function includes disabling sync functionality in an email application residing on the mobile device.

7. The method of claim 1 wherein the disabling the given function includes disabling a wireless transceiver on the mobile device.

8. A computer-implemented method, comprising:
- determining, at a first computing device at a first location, that a second computing device is proximate the first location;
- receiving, at the first computing device, a message from the second computing device, the message providing an indication of one or more functions that are performed by the second computing device;
- determining, at the first computing device, whether the one or more functions that are performed by the second computing device overlap with one or more functions enabled at the first computing device;
- disabling, at the first computing device and in accordance with a device usage policy, each specific function of the one or more functions enabled at the first computing device when the specific function overlaps with the one or more functions that are performed by the second computing device;
- determining, at the first computing device, that a device type of the second computing device is not specified in the device usage policy;
- retrieving, by the first computing device, a default rule from the device usage policy, the retrieving being performed in response to the determination that the device type of the second computing device is not specified in the device usage policy; and
- determining, by the first computing device, a particular action for reducing power consumption in accordance with the default rule.

9. The method of claim 8, further comprising:
- determining, by the first computing device, that the first computing device has moved to a second location, the second location being different from and not proximate to the first location; and
- re-enabling, by the first computing device, each specific function that was disabled based on determining that the first computing device has moved to the second location.

10. The method of claim 8, further comprising outputting, by the first computing device, a notification that the specific function has been disabled.

11. The method of claim 8, wherein receiving the message from the second computing device comprises receiving a wireless message transmitted directly from the second computing device.

12. The method of claim 8, wherein receiving the message from the second computing device comprises receiving a wireless message transmitted indirectly from the second computing device.

13. The method of claim 12, wherein receiving the wireless message transmitted indirectly from the second computing device comprises receiving a message from a cloud computing service.

14. The method of claim 8, wherein determining that the second computing device is proximate the first location comprises receiving a wireless message transmitted directly from the second computing device.

15. The method of claim 8, wherein determining that the second computing device is proximate the first location comprises receiving a wireless message transmitted indirectly from the second computing device.

16. The method of claim 8, wherein determining that the second computing device is proximate the first location comprises receiving a message from a cloud computing service.

17. A computer-implemented method, comprising:
- determining, at a first computing device at a first location, that a second computing device is proximate the first location based on receiving a message transmitted at least one of: (i) directly from the second computing device, (ii) indirectly from the second computing device, and (iii) from a cloud computing service, the message providing an indication of one or more functions that are performed by the second computing device;
- determining, at the first computing device, whether the one or more functions that are performed by the second computing device overlap with one or more functions enabled at the first computing device based on the indication;
- disabling, at the first computing device and in accordance with a device usage policy, each specific function of the one or more functions enabled at the first computing device when the specific function overlaps with the one or more functions that are performed by the second computing device;

determining, at the first computing device, that a device type of the second computing device is not specified in the device usage policy;

retrieving, by the first computing device, a default rule from the device usage policy, the retrieving being performed in response to the determination that the device type of the second computing device is not specified in the device usage policy; and determining, at the first computing device, a particular action for reducing power consumption in accordance with the default rule outputting, by the first computing device, a notification that each specific function has been disabled.

18. The method of claim 17, further comprising:

determining, by the first computing device, that the first computing device has moved to a second location, the second location being different from and not proximate to the first location; and re-enabling, by the first computing device, each specific function that was disabled based on determining that the first computing device has moved to the second location.

19. The method of claim 18, wherein receiving the message comprises receiving a wireless message.

20. The method of claim 17, wherein the device usage policy specifies a function supported by the first computing device, the device type of the second computing device, and an indicia for handling the function.

* * * * *